United States Patent
Kacines

[19]

[11] Patent Number: 6,079,750
[45] Date of Patent: *Jun. 27, 2000

[54] INTEGRATED HOSE BODY QUICK CONNECTS

[75] Inventor: Steven C. Kacines, Fort Wayne, Ind.

[73] Assignee: Dana Corporation, Toledo, Ohio

[*] Notice: Under 35 U.S.C. 154(b), the term of this patent shall be extended for 19 days.

[21] Appl. No.: 08/715,422

[22] Filed: Sep. 18, 1996

[51] Int. Cl.$^7$ ........................................................ F16L 3/00
[52] U.S. Cl. .............................. 285/62; 285/23; 285/192; 285/205; 285/319; 285/322; 285/351; 285/906; 285/921
[58] Field of Search ..................................... 285/319, 323, 285/348, 174, 910, 62, 23, 192, 205, 322, 351, 906, 921

[56] References Cited

U.S. PATENT DOCUMENTS

| | | | |
|---|---|---|---|
| 2,062,449 | 12/1936 | Dick | 285/62 |
| 3,826,523 | 7/1974 | Eschbaugh | 285/319 X |
| 3,963,267 | 6/1976 | Legris . | |
| 4,005,883 | 2/1977 | Guest . | |
| 4,645,246 | 2/1987 | Guest . | |
| 4,828,297 | 5/1989 | Tarum | 285/348 X |
| 5,042,848 | 8/1991 | Shiozaki . | |
| 5,064,227 | 11/1991 | Spors et al. | 285/319 |
| 5,257,833 | 11/1993 | McNaughton | 285/319 |
| 5,284,369 | 2/1994 | Kitamura . | |
| 5,374,084 | 12/1994 | Potokar | 285/319 X |
| 5,387,016 | 2/1995 | Joseph et al. | 285/174 |
| 5,573,279 | 11/1996 | Rea et al. | 285/910 |

Primary Examiner—Dave W. Arola
Attorney, Agent, or Firm—Millen, White, Zelano & Branigan

[57] ABSTRACT

Quick connect couplings for connecting a small internal diameter brake hose to a formed metal tube in a brake system includes a connector body having a crimp collar at one end and a stepped bore with an entry opening at the other end. The stepped bore includes a first step which is abutted axially by a seal. In accordance with a preferred embodiment, a retaining element axially engages an inwardly extending radial surface in the bore and an annular groove in the tube. In accordance with the preferred embodiment, the retaining ring is integral with the tube and the seal is accomplished by a three lobed seal which is held in abutment with the first step by a Teflon® spacer, the Teflon® spacer being engaged by a bead on the formed metal tube.

16 Claims, 3 Drawing Sheets

INTEGRATED HOSE BODY QUICK CONNECTS

FIELD OF THE INVENTION

The present invention relates to configurations for integrated hose body quick connects. More particularly, the present invention relates to configurations for integrated hose body quick connects in which a body of a hose coupling receives a tube in order to connect a hose to the tube.

BACKGROUND OF THE INVENTION

Motor vehicles generally utilize hydraulic brake systems in which pressurized hydraulic fluid is used to transmit force necessary to engage brake shoes. Generally, various components of a brake system such as the master cylinder, actuator and brake cylinders may be interconnected by lines including reinforced rubber hoses having couplings at each end. It is current practice to utilize threaded connections for many of these couplings but it is more desirable to use quick connect couplings whenever possible. With quick connect couplings, a connection is made by simply shoving a coupling over a tubular member. It is, of course, important that the occurrence of hydraulic leaks is minimized and that the assembler know that positive hydraulic coupling has been accomplished when "quick connecting" a hose to a tube.

One area in which it is sought to replace conventional hydraulic couplings which rely on threaded connectors with quick connect couplings are the couplings in which ⅛ inch ³⁄₁₆ inside diameter hydraulic brake hose is coupled to formed metal tubes which have an internal diameter of about 0.135 inch. With such small diameters, it is frequently difficult to actually know if a positive connection has been made by the assembler and it is difficult to ensure that the possibility of leaks has been minimized.

SUMMARY OF THE INVENTION

In view of the aforementioned considerations, it is a feature of the present invention to provide a new and improved quick connect coupling in which the possibility of leaks is minimized and which provides the assembler with an indication that a secure, positive connection has been accomplished.

The present invention is directed to a quick connect coupling for connecting a hose to a tube with a connector body having a first end for connection to the hose and a second end for connection to the tube. A stepped bore is formed in the body through the second end for receiving the tube. The stepped bore includes a first bore section for communicating with the hose; a second bore section for receiving a sealing arrangement that seals radially against the tube; and a third bore section for receiving a retaining element. A shoulder within the third bore section extends radially inwardly for engaging the retaining element to prevent axial movement of the retaining element out of the third bore section; and a groove is provided in the tube for abutting the other end of the retaining element to prevent axial movement of the tube out of the connector body.

In accordance with a preferred aspect of the invention, the tube further includes a outwardly radially extending bead for axial abutment with the sealing arrangement and the retaining element is held integrally with the tube at the bead. Preferably, the sealing arrangement includes a deformable seal with a plurality of lobes and a Teflon® spacer engaged by the bead on the tube.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
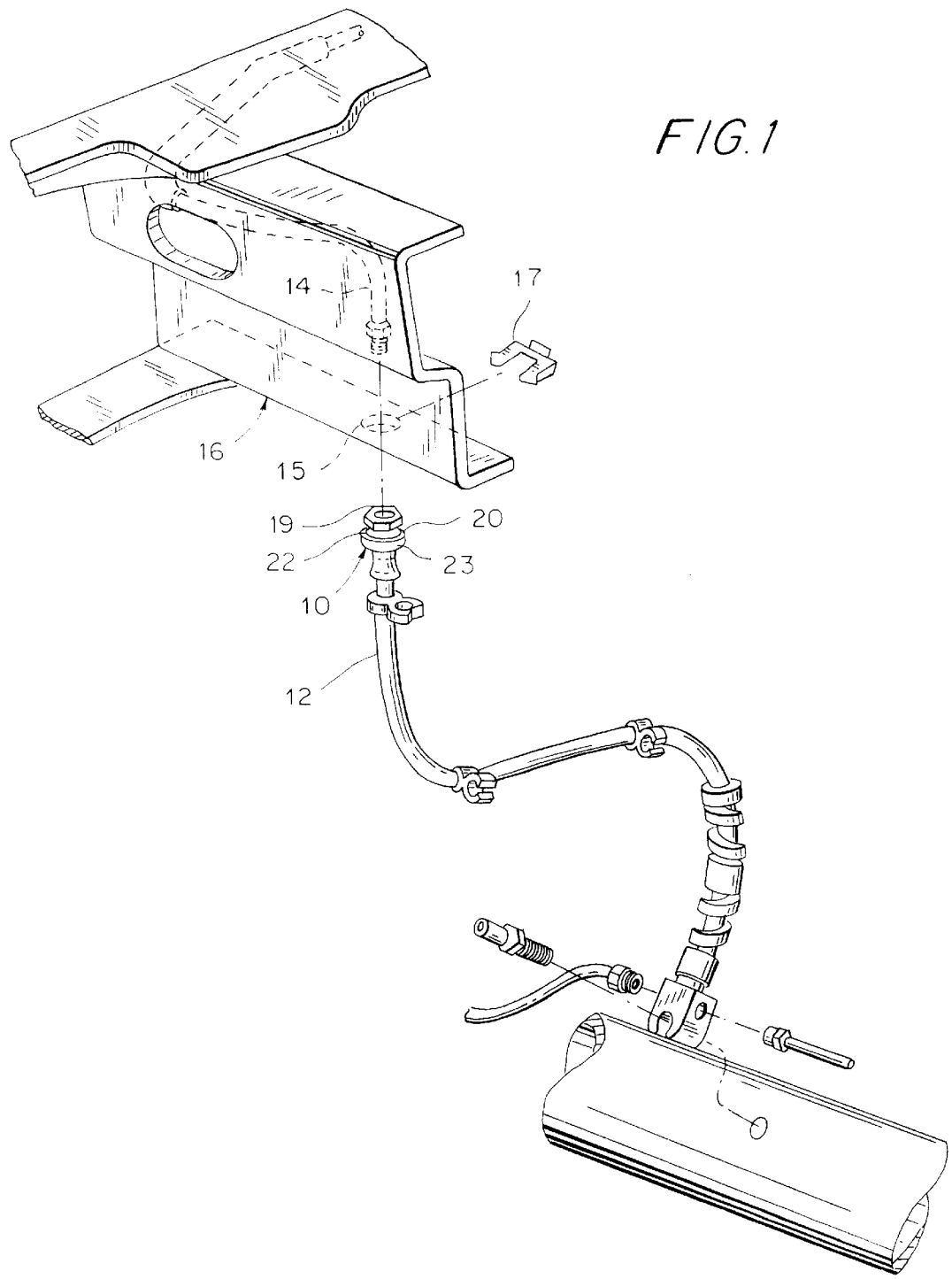
FIG. 1 is a perspective view showing how the quick connector of the present invention is used in a brake system of a vehicle.

Referring now to FIG. 1, there is shown a connector body 10 for coupling a reinforced hydraulic brake hose 12 to a formed metal tube 14 via a hole 15 in a frame member 16 of a vehicle body, in which hole the connector body is retained by a U-shaped clip 17.

Figure 2:
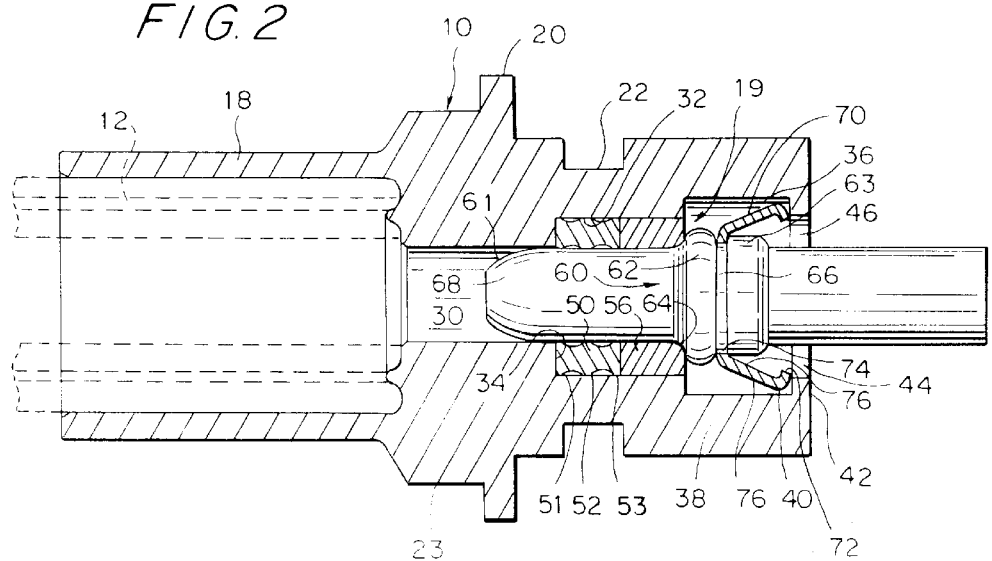
FIG. 2 is a side view, partially in elevation showing a first a preferred embodiment of a quick connect coupling configured in accordance with the principles of the present invention.

Referring now to FIG. 2 in combination with FIG. 1, the connector body 10 includes a crimping collar 18 which is crimped around and into the outer surface of the brake hose 12 in accordance with known procedures and a stepped bore 19 into which the formed metal tube 14 is received and retained. The quick connector body 10 includes a flange 20 for axially positioning the connector body against the frame member 16 and a groove 22 for receiving the U-shaped clip 17 (see FIG. 1). A hex nut section 23 is in front of the flange 20 to perhaps facilitate gripping the connector body 10, but is no longer needed to help effect a threaded connection with the metal tube 14 because there is no threaded connection with the metal tube.

The stepped bore 19 includes three bore sections. The first bore section 30 has a diameter of about 0.195 inch for communicating with the ⅛ inch ID reinforced brake hose. The first bore section 30 is aligned with a second bore section 32 which has a first annular shoulder 34 and functions as a sealing bore section. The second bore section 32 is aligned with a third bore section 36 which functions as a retaining bore section is disposed between a second step 38 and an internal shoulder 40 on a flange 42. The flange 42 has an inner wall 44 which defines an entry opening 46.

The second bore section 32 provides a sealing section and includes a three-lobed seal 50 having first, second and third lobes 51, 52 and 53, respectfully. The three-lobed seal 50 abuts the first shoulder 34 and is in turn abutted by a Teflon® spacer 56. The three-lobed seal 32 seals with a nipple portion 60 of the formed metal tube 14 with the lobes 51, 52 and 53 sealing both against the nipple 60 and the wall of the second bore section 32. The nipple 60 includes a first bead 62 having a front frustoconical surface 64 that engages the Teflon® spacer 56 when the formed metal tube 14 is pressed home.

Figure 3:
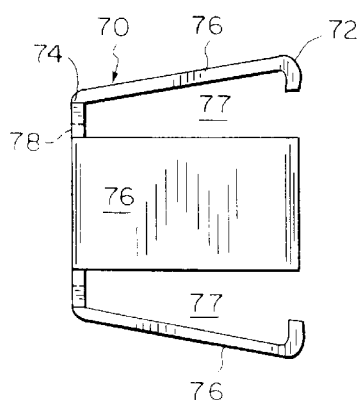
FIG. 3 is an enlarged side view of a retaining ring used with the quick connect coupling of FIG. 2.
Figure 4:
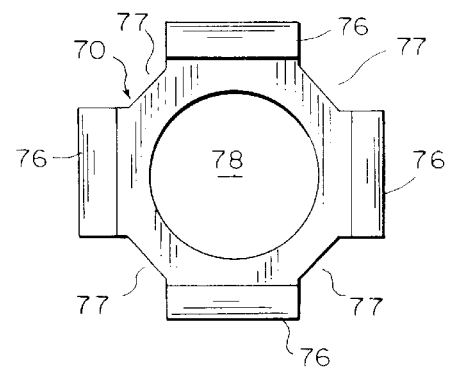
FIG. 4 is an enlarged end view of the retaining ring of FIG. 3.

Just behind the first bead 62 and between the first bead and a second bead 63 is an annular groove 66 formed in a radially expanded portion 68 of the formed metal tube 14. The groove 66 receives a retaining element 70 which has a first end 72 engaging the shoulder 40 on the flange 42 and a second end 74 seated in the groove in order to retain the formed metal tube 14 within the connector body 10. As is seen in FIGS. 3 and 4, the first end 72 of the retaining element 70 is formed at the ends resilient fingers 76 with spaces 77 therebetween so as to provides a deflectable structure for the retaining element 70. The retaining element 70 is made of steel and includes a round central hole 78 at the second end 74 thereof which receives the formed metal tube 14.

When the formed metal tube 14 is axially pressed home, the first bead 38 pushes against the Teflon® spacer 56 in order to compress the three lobed seal 50 against the first shoulder 34. The fingers 76 of the retaining element 70 are deflected inwardly when the fingers engage the inner wall 44 of the flange 42 allowing the formed metal tube 14 to be inserted fully into the stepped bore 19 of the body member 10. After completely entering the third bore section 36 of the bore 19, the fingers 76 of the retaining element 70 expand so that the second end 74 thereof snaps behind the shoulder 40; thus, preventing axial movement between the connector body 10 and the formed metal tube 14. When the retaining element 70 snaps to the position of FIG. 1, there is an audible "click" which is heard by the assembler. This assures the assembler that the formed metal tube 14 is properly seated in the connector body 10 so that it will not come out and to minimize the possibility of leaks.

Preferably, the retaining element 70 is integrally seated in the groove 66 by a series of cold forming operations in which the retaining element is positioned around the formed metal tube 14 and the tube is upset proximate the retaining element to form the first and second beads 62 and 63, respectfully.

Figure 5:
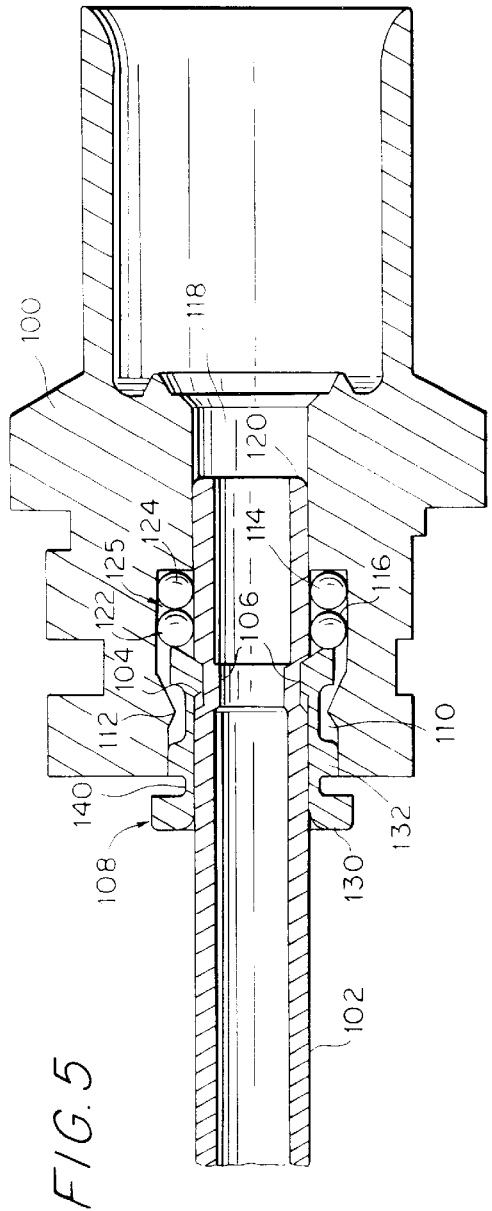
FIG. 5 is a side elevation of a second embodiment of a quick connect coupling embodying the features of the present invention.
Figure 7:
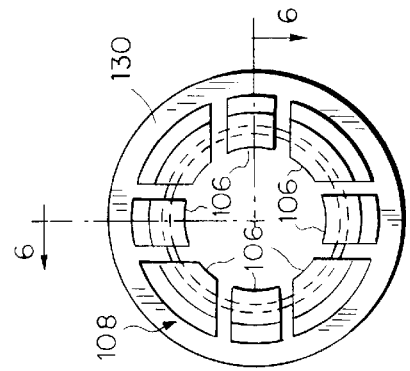
FIG. 7 is an end view of the collet of FIG. 6.
Figure 6:
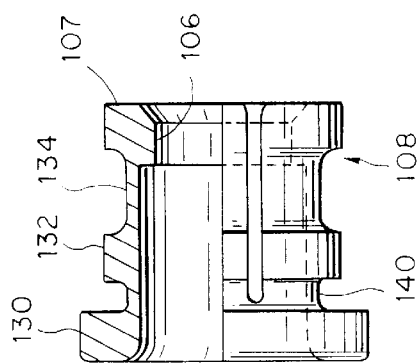
FIG. 6 is a side view, partially in elevation, of a collet used with the second embodiment of the invention shown in FIG. 5.

Referring now to FIGS. 5–7, there is shown a second embodiment of the invention, wherein a connector body 100 is connected to a formed metal tube 102. In this embodiment, the formed metal tube 102 has a rolled annular groove 104 formed therein. The rolled annular groove 104 receives detents 106 projecting radially inwardly from a detent end 107 of the collet 108, which collet is retained in a bore 110 of the connector body 100 by an inwardly projecting shoulder 112.

The bore 110 includes a step 114 between a sealing bore section 116 and a connecting bore section 118. The connecting bore section 118 receives the nipple end 120 of the formed metal tube 102 while the sealing bore section receives 116 first and second O-rings 122 and 124 of an O-ring package 125. The O-ring 124 abuts the step or shoulder 114 while the O-ring 122 is abutted by the detent end 107 of the collet 108. O-ring package 25 can readily be replaced by a seal such as seal 50 shown in FIG. 2.

Referring now to FIGS. 6 and 7, it is seen that the collet 108 has an end collar 130 and a first lobe 132. The first lobe 132 cooperates with the detent portion 106 to define a groove 134. The groove 134 receives the internal shoulder 112 of the connector body 100 (see FIG. 5 so as to prevent the collet 108 from being withdrawn from the body 100. Just behind the collar 130 is another groove 140 which allows one to insert a tool in order to extract the collet 108 from the bore 110 if necessary or desired.

When the formed metal tube 102 is shoved home, an audible "click" occurs when the detents 106 engage in the rolled annular groove 104 in the formed metal tube 102. This audible "click" indicates to the assembler that the connector body 100 and formed metal tube 102 are positively seated so that the formed metal tube cannot be withdrawn and so that the O-rings 122 and 124 seal against the exterior surface of the formed metal tube and sealing bore section 116.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hydraulic brake hose assembly, comprising:
   a quick connect coupling for connecting a brake tube to a brake hose, the brake hose having an inside diameter in the range of about ⅛ inch to about 3/16 inch; wherein the quick connect coupling comprises, in combination with the brake tube and brake hose:
   a connector body having a first end for crimped connection to the brake hose and a second end for connection to the brake tube;
   a resilient retaining element extending between the brake tube and connector body;
   a stepped bore in the second end of the body for receiving the brake tube, the stepped bore including a first bore section for communicating with the brake hose, a second bore section for receiving a sealing arrangement that seals between the brake tube and second bore section and a third bore section for receiving the retaining element;
   a shoulder within the third bore section extending radially inwardly for engaging one portion the retaining element to prevent axial movement of the retaining element out of the third bore section; and
   a groove in the brake tube for abutting another portion of the retaining element to prevent axial movement of the tube from the connector body.

2. The hydraulic brake hose assembly of claim 1, wherein the tube further includes a outwardly radially extending bead for axial abutment with the sealing arrangement to hold the sealing arrangement in position.

3. The hydraulic brake hose assembly of claim 2, wherein the sealing arrangement comprises a sealing element and a spacer element wherein the sealing element abuts an axially facing shoulder at the end of the second bore section and the spacer element is disposed between the sealing element and the bead of the tube.

4. The hydraulic brake hose assembly of claim 3, wherein the sealing element has three axially spaced, radially extending lobes for engaging the tube and the wall of the second bore section in the connector body.

5. The hydraulic brake hose assembly of claim 4, wherein the spacer is a Teflon® ring.

6. The hydraulic brake hose assembly of claim 5, wherein the retaining element has a first end with a diameter greater than a second end, the retaining element being integral with the tube at the location of the groove in the tube.

7. The hydraulic brake hose assembly of claim 1, wherein the tube is metal and includes a tapered end portion which is received in the first bore portion.

8. The hydraulic brake hose assembly of claim 1, wherein the tube is metal and has an internal diameter less than 0.135 inch for coupling with a ⅛ inch or 3/16 inch internal diameter hose.

9. The hydraulic brake hose assembly of claim 1, wherein the retaining element has a first end with a diameter greater than a second end, the retaining element being integral with the tube at the location of the groove in the tube.

10. The hydraulic brake hose assembly of claim 9, wherein the retaining element is comprised of a plurality of fingers attached to the tube at the second end and spaced radially from the tube at the first end.

11. The hydraulic brake hose assembly of claim 1, wherein the resilient retaining element is a collet normally within with the connector body and wherein the collet includes an end portion for axially engaging the sealing arrangement to hold the seal in abutment with an axially facing shoulder.

12. The hydraulic brake hose assembly of claim 11, wherein the tube is a metal tube having an internal diameter less than a ⅛ inch internal diameter of the brake hose to which it is connected by the quick connect coupling.

13. The hydraulic brake hose assembly of claim 11, wherein the sealing arrangement is a package comprised of a pair of O-rings.

14. The hydraulic brake hose assembly of claim 12, wherein the O-rings have substantially the same dimensions.

15. The hydraulic brake hose assembly of claim 13, wherein the connector body has a crimp collar associated therewith for forming a permanent crimped connection with the end of the hose.

16. The hydraulic brake hose assembly of claim 1, wherein the brake hose and brake tube are coupled to one another at a bulkhead and wherein the connector body has an external groove for receiving a clip to retain the coupling on the bulk head.

* * * * *